Sept. 22, 1931.  O. B. RECTOR  1,824,233
POTATO PLANTING PROCESS AND POTATO PLANTER
Filed July 21, 1930  2 Sheets-Sheet 1
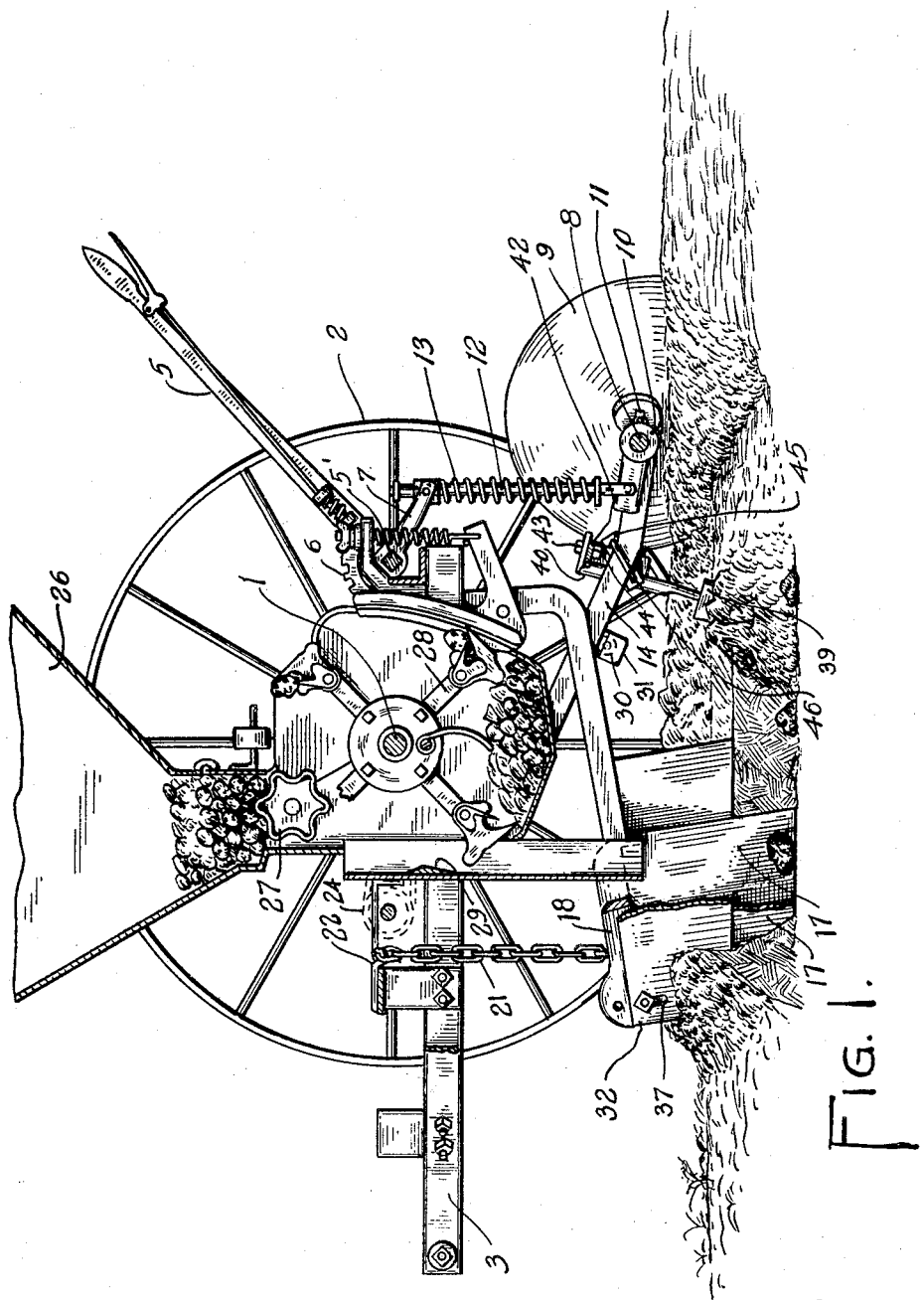
Orland Bazil Rector
INVENTOR
BY
Rolland S. Trott ATTORNEY Sept. 22, 1931.  O. B. RECTOR  1,824,233
POTATO PLANTING PROCESS AND POTATO PLANTER
Filed July 21, 1930    2 Sheets-Sheet 2

Orland Bazil Rector
INVENTOR

BY

Rolland S. Trott ATTORNEY

Patented Sept. 22, 1931

1,824,233

UNITED STATES PATENT OFFICE

ORLAND BAZIL RECTOR, OF EATON, COLORADO

POTATO PLANTING PROCESS AND POTATO PLANTER

Application filed July 21, 1930. Serial No. 469,313.

My invention relates to a process for planting potatoes, and to potato planters and more especially to potato planters which are to be used in fields having a layer of dry surface earth above the damp sub-surface earth, whereby my process may be carried out.

The object of my invention is to provide a potato planting process and a potato planter which will plant the potato in the damp sub-surface earth and cover it with the damp sub-surface earth and which will subsequently cover the damp sub-surface earth with the dry surface earth in substantially the original layers.

A further object is to provide a potato planter which may be made as an attachment for many of the potato planters now on the market.

In dry climates there are times when the surface of the ground is exceedingly dry, though there may be damp earth down a few inches from the surface.

Potato planters now on the market are of various constructions but all of them are provided with a plow, shoe or other ditch means, to make a ditch into which the planter drops the seed potatoes at substantially equal intervals, and they are all provided with shoes, shovels, discs or other covering means which replace the earth in the ditch after the potatoes are dropped therein.

My process comprises digging a ditch in the dry surface earth, digging a second ditch in the bottom of the first ditch and planting and covering potatoes therein, and then filling the first ditch with the earth removed therefrom.

In actual operation, with any of the potato planters now on the market, the covering means operates in such a way that the dry earth falls directly upon the seed potatoes, and the damp earth lies upon the surface. And even in the best of them, at least a large part of the earth which falls directly upon the seed potatoes is dry and not damp earth.

The result is that the seed potatoes impart much of their moisture to the dry earth touching them, and they become dried out and shriveled up and later begin to rot.

Experiments have proven that potatoes planted in the same field at the same time, but covered by the damp earth, will sprout in the normal way. The difference between the two methods of planting is often the difference between a crop failure and a normal crop. All that can save the potatoes planted and covered with dry earth is a rain or irrigation within a short time after planting.

In my invention, the dry surface earth is removed from the damp sub-surface earth by an auxiliary plow, shoe, or other ditching means, the ordinary potato planter then works upon the exposed damp earth, digging the ditch, dropping in the potatoes, and covering them with the damp earth as if the surface of the damp earth were the ground surface, and the dry earth which was first removed is then replaced by auxiliary shoes, shovels, discs or other covering means, after the potatoes are planted and covered in the damp sub-surface earth.

All of this is more fully described below and is illustrated in the drawings, in which;—

Figure 1 is a side elevation in partial section, of my potato planter as it would appear in operation.

Figure 3:
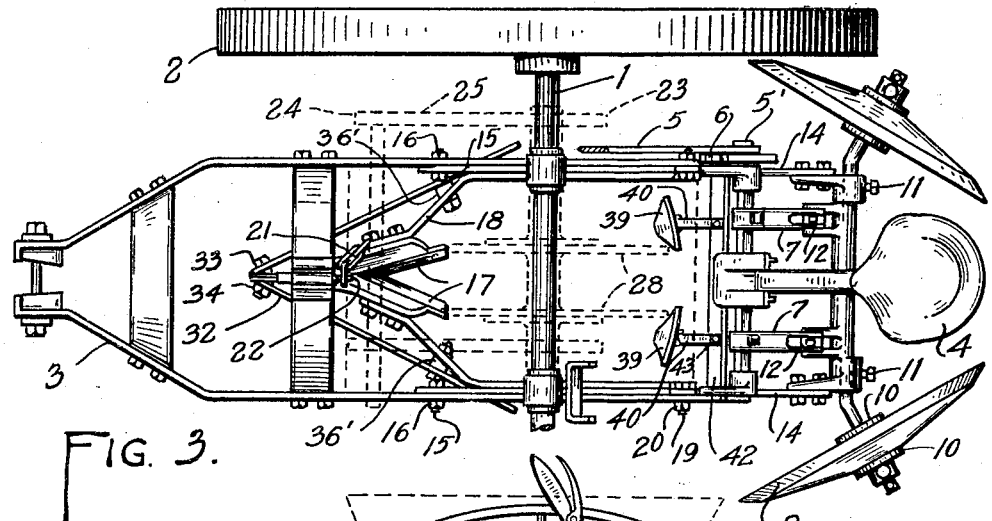
Figure 3 is an elevation in partial section of the device as shown in Figure 2 but seen from above.

The main parts of the ordinary potato planter may be designated as follows;— axle 1, wheel 2, frame 3, seat 4, hand lever 5, hand lever shaft 5', hand lever ratchet 6, hand lever arm 7, disc shaft 8, disc 9, disc shaft collars 10, disc shaft collar set screws 11, disc lifting rods 12, disc lowering springs 13, disc mounting frame 14, disc mounting frame pivot bolts 15 and nuts 16, shoe 17, shoe mounting frame 18, shoe mounting frame pivot bolts 19, and nuts 20, shoe limit chain 21, limit chain hook 22, driving sprocket 23, driven sprocket 24, driving chain 25, reservoir 26, feeder wheel 27, feeder arms 28, trip 29, shoe lifting roller 30, lifting roller bracket 31.

Figure 2:
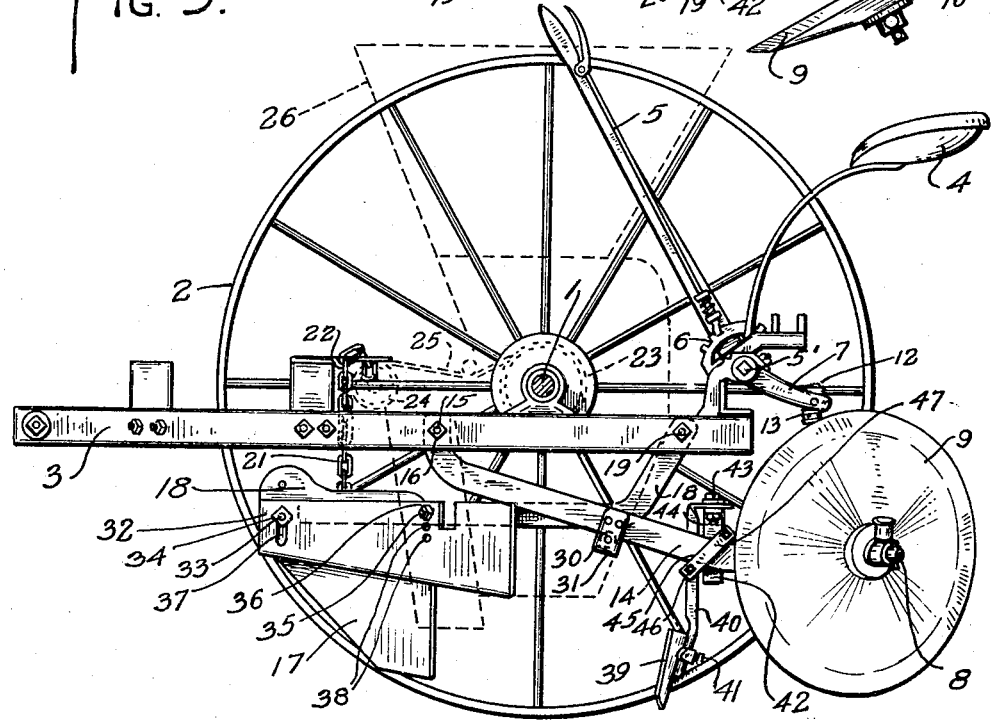
Figure 2 is a side elevation of my device in partial section as it appears when set for moving from one field to another, that is, when the planting operation is not being performed.

In Figures 2 and 3 the reservoir and feeding mechanism are merely indicated by dotted lines, the better to show the parts of my invention proper.

The blades 32 are bolted to the shoe 17 by the bolt 33 and nut 34, and are bolted to the shoe mounting frame 18 by the bolts 35, and nuts 36, the bolts 35 passing through the angle spacers 36', which properly position the blades 32. The blades 32 are provided with the slot 37 and the holes 38 by which its elevation on its mountings may be changed. Any other mounting by which the elevation of the blades may be changed may be used so long as the desired results are obtained. The two blades 32 form the auxiliary plow, shoe, or ditching means, but may be used in one unit if desired, or in any other proper manner, so long as the desired results are obtained.

The auxiliary ditching means is set so that the bottom of the ditch it forms is composed of damp earth. This of course will vary in depth with the season and also with the field, and it is for this reason that the elevation of the blades 32 are made adjustable in height.

The shovels 39 are mounted on the shovel handle 40 by the set screw 41 or by any other proper means. The shovel handle 40 is mounted on the shovel bar 42 by the bolt 43 and nut 44. The angle of the shovel 39 may be changed either at its mounting on the handle 40 or at the mounting of the handle 40 on the bar 42.

The bar 42 is mounted upon the disc mounting frame 14 by means of the clamp bar 45, U-bolt 46 and nuts 47.

The shovels 39 may be raised or lowered either by their mounting on the handles 40 or by the mounting of the bar 42 on the disc mounting frame 14.

The shovels 39 will generally be mounted about the same distance below the discs 9 as the shoe 17 is below the blades 32.

When the machine is in the position shown in Figure 2, the hand lever 5 has been pushed forward, which by revolving the hand lever shaft 5' and the arm 7, has raised the entire disc assembly about the disc mounting frame pivot bolts 15. In this upward movement of the disc mounting frame 14, the shoe lifting rollers 30 have contacted and lifted the shoe mounting frame 18 and shoe 17 and blades 32 about the shoe mounting frame pivot bolts 19. The chain 21 has then been hooked up on the hook 22.

In the position shown for operation in Figure 1, the hand lever 5 has been pulled back, dropping the entire disc assembly about the pivot bolts 15, and dropping the shoe frame 18 about the pivot bolts 19, and the chain 21 has been hooked at the proper length on the hook 22.

In the operation of my invention, the auxiliary ditching means composed of the blades 32 removes the dry earth from the underlying damp earth when the height of the blades has been properly set on its mounting and the chain 21 has been hooked at the proper height. The shoe 17 then digs the ditch for the potatoes in the usual way, but it is dug in the damp earth under the level of the dry surface earth, which has been removed.

The shovels 39, which are to be set at the proper height with respect to the shoe 17 just as if the shoe 17 were working at the level of the ground, move the two ridges of damp earth thrown up by the shoe 17, back into the ditch it formed, thus covering the potatoes planted by the machine, with the damp earth thrown up by the shoe 17. What is left is a ridge of damp earth covering the potatoes, and in the ditch formed by the blades 32.

The discs 9, which follow the shovels 39 then move the dry earth first removed by the blades 32, back into the ditch and on top of the damp earth ridge.

Thus, the potatoes have been planted by a standard type of potato planter operating on a lower than standard earth level, which lower than standard earth level has been made by the blades 32. And the discs 9 have then replaced the dry earth and covered the lower than standard earth level.

It will be seen that any kind, type or construction of ordinary potato planter may be used so long as it drops the potatoes in the ditch it forms and covers the dropped potatoes.

Also, any kind, type or construction of ordinary and of auxiliary ditching means may be used, so long as the auxiliary ditching means removes the dry earth and the ordinary ditching means makes a ditch in the damp earth, thus exposed.

Also, any kind, type or construction of ordinary and of auxiliary covering means may be employed, so long as the auxiliary covering means replaces the dry earth after the potatoes have been covered by the damp earth, and any kind, type or construction of ordinary covering means may be used so long as it acts to cover the potatoes with the damp earth from the ditch in which the potatoes are dropped.

The exact construction shown is that of a well known make of potato planter upon which as a base, my invention has been built. But any other proper base construction may if desired be used.

In the ordinary planter the discs are used to cover the potatoes. But, in this particular case I found it easier to use the discs as the auxiliary covering means, and to use shovels for the ordinary covering means. It can be seen, of course, that the two means can be interchanged without change in result, so long as the damp earth is moved to cover the potatoes before the dry earth is moved to fill the ditch made by the auxiliary ditching means.

I am well aware that various changes may be made in many parts of the construction described which will not materially alter the results obtained, but I consider these as being merely mechanical equivalents, so long as the device digs a ditch in the dry earth and digs a second ditch in the bottom of the first and plants and covers the potatoes therein and then covers the first ditch with the earth removed from it.

Therefore, I do not wish to be narrowly held to the exact construction shown, but what I claim as new, and desire to protect by Letters Patent is as follows:—

1. The process of planting potatoes, which comprises removing the dry surface earth, planting and covering the potatoes where the dry earth has been removed, and then replacing the dry earth.

2. The process of planting potatoes which comprises digging a ditch of substantially the depth of the dry surface earth, planting and covering the potatoes below the bottom of said ditch, and covering the planted potatoes with the dry surface earth first removed.

3. The process of planting potatoes which comprises digging a ditch of substantially the depth of the dry surface earth, digging a second ditch in the bottom of the first ditch, dropping seed potatoes in the bottom of the second ditch, replacing the earth from the second ditch and thereby covering the potatoes, and then replacing the dry surface earth in the ditch first dug.

4. In a potato planter, the combination of a wheeled machine, ditching means carried thereby, a second ditching means carried by the machine and following the first ditching means and operating at a greater depth and digging a ditch of less width than the first ditching means, potato storing and dropping means carried by the machine to drop potatoes behind the second ditching means, and separate covering means, to replace the earth in the second ditch and then the earth in the first ditch, carried by the machine.

5. In a potato planter, the combination of a shallow ditching means followed by a deep ditching means, means to carry and drop seed potatoes in the wake of the deep ditching means, and deep covering means adapted to replace the earth moved by the deep ditching means followed by shallow covering means adapted to replace the earth moved by the shallow ditch means, and a wheeled machine upon which all of said means are carried.

6. In a potato planter, the combination of means to dig a broad shallow ditch, means following thereafter to dig a narrow ditch in the bottom of the shallow ditch, means to carry and drop seed potatoes in the narrow ditch, means to replace the earth in the narrow ditch, and means following thereafter to replace the earth in the shallow ditch, and a wheeled machine upon which all of said means are carried.

7. The process of planting potatoes which comprises digging a ditch of substantially the depth of the dry surface earth, dropping potatoes in a second and narrower ditch dug in the damp earth in the bottom of the first ditch and covering the potatoes with the damp earth removed from the second ditch and then replacing the dry earth removed from the first ditch, whereby the potatoes will be planted in and covered by damp earth and the planted potatoes will be covered by the layer of dry surface earth.

8. In a potato planter the combination of a shallow and relatively wide ditching device, a deeper and narrower ditching device, a device to carry and drop seed potatoes in the ditch made by the second ditching device, covering means following the second ditching device to replace the earth moved thereby and covering means following the first covering means to replace the earth moved by the first ditching device and a wheeled machine upon which said devices and means are carried, whereby the seed potatoes may be planted in and covered by damp earth and the planted potatoes then covered by the dry surface earth moved by the first ditching device.

In testimony whereof I affix my signature.

ORLAND BAZIL RECTOR.